(12) United States Patent  
Hisada

(10) Patent No.: US 9,573,487 B2  
(45) Date of Patent: Feb. 21, 2017

(54) ELECTRICALLY DRIVEN VEHICLE

(71) Applicant: Shuhei Hisada, Nisshin (JP)

(72) Inventor: Shuhei Hisada, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 10 days.

(21) Appl. No.: 14/428,842

(22) PCT Filed: Sep. 9, 2013

(86) PCT No.: PCT/IB2013/001947  
§ 371 (c)(1),  
(2) Date: Mar. 17, 2015

(87) PCT Pub. No.: WO2014/045091  
PCT Pub. Date: Mar. 27, 2014

(65) Prior Publication Data  
US 2015/0231988 A1   Aug. 20, 2015

(30) Foreign Application Priority Data

Sep. 21, 2012   (JP) .................................. 2012-207992  
Mar. 21, 2013   (JP) .................................. 2013-058238

(51) Int. Cl.  
*H02P 1/00*   (2006.01)  
*B60L 11/18*   (2006.01)

(52) U.S. Cl.  
CPC .................................. *B60L 11/1874* (2013.01)

(58) Field of Classification Search  
CPC .............................. H02H 7/0852; H02H 6/005  
USPC ................................................. 318/139, 471  
See application file for complete search history.

(56) References Cited

U.S. PATENT DOCUMENTS

| | | | | |
|---|---|---|---|---|
| 2,440,369 | A | * | 4/1948 | Furman ............... H01M 10/625 123/142.5 E |
| 2009/0133943 | A1 | | 5/2009 | Noguchi et al. |
| 2010/0104935 | A1 | * | 4/2010 | Hermann ............ H01M 10/502 429/120 |
| 2012/0094165 | A1 | * | 4/2012 | Valencia, Jr. ..... H01M 10/0525 429/120 |

(Continued)

FOREIGN PATENT DOCUMENTS

| | | |
|---|---|---|
| CN | 102484391 A | 5/2012 |
| JP | 61-035368 U | 3/1986 |

(Continued)

OTHER PUBLICATIONS

Partial translation of Japanese Office Action issued on Aug. 4, 2014 in corresponding JP Patent Application No. 2013-058238.

*Primary Examiner* — Rina Duda  
(74) *Attorney, Agent, or Firm* — Sughrue Mion, PLLC

(57) ABSTRACT

An electrically driven vehicle (2) is equipped with a motor (9) for running, a first battery (4), a second battery (3), a liquid-cooled cooler that cools the first battery, and a temperature adjuster. The first battery is configured to supply an electric power to the motor, and has a first capacity and a first output. The second battery is configured to supply an electric power to the motor, and has a second capacity that is different from the first capacity, and a second output that is different from the first output. The temperature adjuster is configured to adjust a temperature of the second battery using a gas as a heat medium.

14 Claims, 8 Drawing Sheets

(56) References Cited

U.S. PATENT DOCUMENTS

2012/0181954 A1 7/2012 Seibert et al.
2012/0297809 A1* 11/2012 Carpenter ............... B60L 1/003
   62/244
2012/0327596 A1* 12/2012 Anderson-Straley H01M 10/625
   361/689

FOREIGN PATENT DOCUMENTS

| JP | 2006-079987 A | 3/2006 |
|---|---|---|
| JP | 2008-141945 A | 6/2008 |
| JP | 2009-027798 A | 2/2009 |
| JP | 2009-110829 A | 5/2009 |
| JP | 2009-126256 A | 6/2009 |
| JP | 2009-126452 A | 6/2009 |
| JP | 2010-231923 A | 10/2010 |
| JP | 2010-280288 A | 12/2010 |
| JP | 201281932 A | 4/2012 |

* cited by examiner

ELECTRICALLY DRIVEN VEHICLE

BACKGROUND OF THE INVENTION

1. Field of the Invention

The invention relates to an electrically driven vehicle.

2. Description of Related Art

It has been proposed to mount an electrically driven vehicle with two kinds of batteries that are different in type from each other (Japanese Patent Application Publication No. 2006-79987 (JP-2006-79987 A)). One of the batteries is a high-output type battery that has small internal resistance and can supply a large electric power (a large current) albeit for a short time. The other battery is a battery that has large internal resistance, cannot supply a large electric power (a large current), but has high energy density (large electric power capacity for its size). Hereinafter, the former will be referred to as a high-output type battery, and the latter will be referred to as a high-capacity type battery.

Nowadays, a lithium-ion battery is often adopted both as the high-output type battery and as the high-capacity type battery. Even a battery employing the same lithium ions can be fabricated as either the high-output type or the high-capacity type by adjusting various parameters such as the kind of an active material, the thickness of an active material layer and the like. Incidentally, the battery technology has been in rapid progress, and high-output type batteries/high-capacity type batteries replacing lithium-ion batteries may appear on the market. It should be noted that the art disclosed by the present specification is not limited to lithium-ion batteries.

By mounting the electrically driven vehicle with the two kinds of the batteries, a high-output/high-capacity power supply can be secured as a whole. Typically, the acceleration performance of the vehicle can be enhanced by mounting it with the high-output type battery, and the cruising distance of the vehicle can be increased by mounting it with the high-capacity type battery.

By the way, since the batteries generate a large amount of heat, the electrically driven vehicle is also mounted with coolers for the batteries. Several arts concerning the coolers have also been proposed. It is more efficient to cool other heat generating devices such as an inverter, a motor and the like as well than to cool the batteries exclusively. Such an art is disclosed in Japanese Patent Application Publication No. 2009-126256 (JP-2009-126256 A). Besides, an art of sending air in a vehicle, which has been adjusted by an air-conditioner or the like, to a battery to cool the battery is disclosed in, for example, Japanese Patent Application Publication No. 2010-280288 (JP-2010-280288 A), Japanese Patent Application Publication No. 2009-110829 (JP-2009-110829 A), and Japanese Patent Application Publication No. 2008-141945 (JP-2008-141945 A). In cooling the devices mounted on the vehicle, one of a liquid-cooled system and an air-cooled system or both of them may be adopted. An art of Japanese Patent Application Publication No. 2009-27798 (JP-2009-27798 A) can be mentioned as an example in which both a liquid-cooled cooler and an air-cooled cooler are adopted. An electrically driven vehicle disclosed by Japanese Patent Application Publication No. 2009-27798 (JP-2009-27798 A) is equipped with two batteries, to which voltage converters are connected respectively. One of the two voltage converters is cooled by the air-cooled cooler, and the other is cooled by the liquid-cooled cooler. As a matter of course, the coolers are required also in the case where the two batteries are different in type from each other.

SUMMARY OF THE INVENTION

The invention provides an electrically driven vehicle that efficiently cools two different types of batteries.

An electrically driven vehicle according to one aspect of the invention is equipped with a motor for running, a first battery, a second battery, a liquid-cooled cooler that cools the first battery, and a temperature adjuster. The first battery is configured to supply an electric power to the motor, and has a first capacity and a first output. The second battery is configured to supply an electric power to the motor, and has a second capacity that is different from the first capacity, and a second output that is different from the first output. The temperature adjuster is configured to adjust a temperature of the second battery using a gas as a heat medium.

In the foregoing aspect of the invention, the second output may be higher than the first output, and the second capacity may be smaller than the first capacity.

In the foregoing aspect of the invention, the second output may be lower than the first output, and the second capacity may be larger than the first capacity.

In the foregoing aspect of the invention, the second battery may be configured to be less frequently used than the first battery.

In the foregoing aspect of the invention, the electrically driven vehicle may further have a circulation channel and a heat exchanger. The circulation channel is configured to circulate a liquid cooling medium to the first battery and another unit that is different from the first battery. The heat exchanger is configured to exchange heat between the liquid cooling medium and air that is taken in by the temperature adjuster.

In the foregoing aspect of the invention, the first battery may be equipped with a water jacket. The circulation channel may extend via the water jacket.

In the foregoing aspect of the invention, the electrically driven vehicle may further have a reserve tank in which the liquid cooling medium is accumulated. The circulation channel may extend via the reserve tank, and the water jacket and the reserve tank may be integrated with each other.

In the foregoing aspect of the invention, the temperature adjuster may be equipped with a first duct. The first duct is in contact with the reserve tank and is configured to send air to the second battery. Furthermore, the temperature adjuster may be configured to send air to the second battery through the first duct if a temperature of the liquid cooling medium has exceeded a predetermined threshold temperature.

In the foregoing aspect of the invention, an air flow channel may be provided between the reserve tank and the second battery. The temperature adjuster may be configured to supply air to the air flow channel if the second battery is in operation, and besides, may be configured to supply air to the second battery if the second battery is stopped.

In the foregoing aspect of the invention, the electrically driven vehicle may further be equipped with an inverter, a reserve tank, and a circulation channel. The inverter is configured to convert an electric power of the first battery and the second battery into an alternating current and supply the alternating current to the motor. In the reserve tank, a liquid for temperature adjustment is accumulated. The circulation channel is configured to circulate the liquid among the first battery, the inverter, and the reserve tank. Besides, the reserve tank may be in contact with a first case in which the first battery is accommodated. Moreover, the reserve tank may be in contact with a second case in which the second battery is accommodated.

In the foregoing aspect of the invention, a second duct through which air sent to the second battery flows may be in contact with the reserve tank.

In the foregoing aspect of the invention, a second duct through which air sent to the second battery flows may extend through an interior of the reserve tank.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
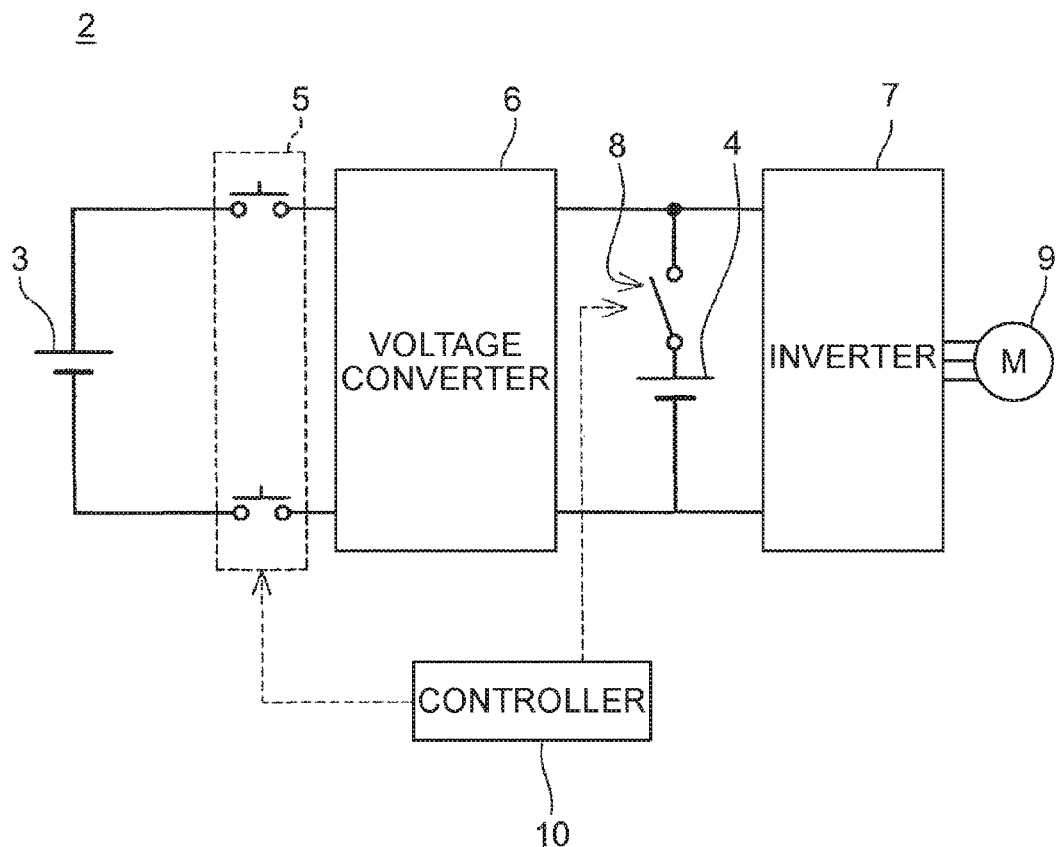
FIG. 1 is a block diagram of an electric power system of an electrically driven vehicle according to each of the embodiments of the invention.

First of all, the outline of the embodiments of the invention will be described hereinafter.

In each of the embodiments of the invention, the heat absorbed by a cooling medium may be effectively utilized by being used to preheat batteries as well. Accordingly, the expression "adjusting the temperatures of the batteries" may be used instead of the expression "cooling the batteries". Incidentally, one of the high-output type battery and the high-capacity type battery will be referred to hereinafter as a first battery, and the other will be referred to hereinafter as a second battery. The second battery is "a battery that is different in capacity and output from the first battery". As one embodiment of the invention, the battery with higher frequency of use may be referred to as the first battery, and the battery with lower frequency of use than the first battery may be referred to as the second battery.

An electrically driven vehicle as each of the embodiments of the invention is equipped with two batteries that are different in output and capacity from each other, namely, the first battery and the second battery. An electric power to be supplied to a motor for running is stored in each of the batteries. One of the first battery and the second battery is designed to be a high-output type, and the other is designed to be a high-capacity type. Examples of the typical utilization pattern of those two types of batteries include a first pattern, a second pattern, and a third pattern, which will be described below. In any of the cases of the first to third patterns, the first battery is a battery that is usually used. In the first pattern, the second battery is a battery that is used together with the first battery in the case where the target output of the motor is large. That is, the case where the target output of the motor is large is a case where the target output is larger than a predetermined output threshold. In the second pattern, the second battery is a battery for backup. The second battery is used if the remaining quantity (the SOC) of the first battery has become lower than a predetermined remaining quantity threshold. In this case, the first battery whose remaining quantity has dropped below the predetermined remaining quantity threshold is stopped. In the third pattern, the electrically driven vehicle is a hybrid vehicle, and the second battery is used when the engine is started by the motor. Incidentally, some of the aforementioned first to third patterns may be combined with each other. There may be utilization patterns other than the aforementioned first to third patterns. In any one of the utilization patterns, the first battery is a usually used battery with a higher frequency of use than the second battery.

The electrically driven vehicle as each of the embodiments of the invention is further equipped with a liquid-cooled cooler that cools the first battery, and a temperature adjuster that adjusts the temperature of the second battery using a gas as a heat medium. The first battery that is more frequently used than the second battery is cooled by the liquid cooling medium, and the second battery that is relatively less frequently used is cooled by the gas (typically air). Incidentally, although described later in detail, if the temperature of the second battery is lower than a temperature range suited for utilization, the temperature adjuster raises the temperature of the second battery. In the electrically driven vehicle as each of the embodiments of the invention, the first battery that is relatively more frequently used is cooled by the liquid cooling medium, and the second battery that is relatively less frequently used is cooled by the gas. That is, the costly liquid-cooled cooler is prepared only for the first battery with a high frequency of use, and the air-cooled cooler (the temperature adjuster) is prepared for the second battery with a low frequency of use. Thus, each of the two batteries whose frequencies of use are different from each other can be efficiently cooled (adjusted in temperature) at low cost.

Incidentally, it may be considered that the temperature of the first battery with the high frequency of use is basically not raised. Accordingly, instead of the name "temperature adjuster", the name "cooler" has been assigned to a mechanism that adjusts the temperature of the first battery. On the contrary, it is assumed that the second battery with the low frequency of use is kept warm during activation in the case where the temperature of outside air is low. Accordingly, the name "temperature adjuster" has been assigned to a mechanism that adjusts the temperature of the second battery.

The high-output type generates a larger amount of heat than the high-capacity type. The first battery with the high frequency of use is designed as the high-output type, and the liquid-cooled cooler is combined therewith. Thus, the battery with a large heat generation amount can be sufficiently cooled. Besides, even if the second battery with the low frequency of use is designed as the high-capacity type with a small heat generation amount and the air-cooled temperature adjuster is combined therewith, the battery can be effectively cooled.

On the other hand, the first battery with the high frequency of use may be designed as the high-capacity type, and the liquid-cooled cooler may be combined therewith. The liquid-cooled type is smaller in specific heat of the cooling medium than the air-cooled type. The likelihood of the occurrence of temperature irregularity increases as the heat generation amount of a heating element increases. The high-capacity type battery that is smaller in heat generation amount than the high-output type battery is adopted as the first battery, so that the first battery with the high frequency of use can be homogeneously cooled. Besides, even in the case where the second battery with the low frequency of use is designed as the high-output type and the air-cooled temperature adjuster is combined therewith, the air-cooled type can sufficiently cope with the situation because the second battery is low in frequency of use.

The aforementioned electrically driven vehicle is preferred to be further equipped with a circulation channel and a heat exchanger. The liquid cooling medium is caused to circulate to the first battery and another unit to be cooled, which is different from the first battery through the circulation channel. The heat exchanger exchanges heat between the liquid cooling medium and the air taken in by the temperature adjuster. In this case, the heat of the liquid cooling medium is conveyed to air, and the temperature of air is raised. If the temperature of outside air is low and the temperature of the second battery before activation has not reached a suitable operating temperature, the second battery can be warmed by high-temperature air.

In order to efficiently cool the first battery by the liquid cooling medium, it is appropriate to adopt a configuration in which the first battery is equipped with a water jacket, and the aforementioned circulation channel extends via the water jacket. Furthermore, it is preferable that a reserve tank be provided integrally with the water jacket, and that the reserve tank extend via the aforementioned circulation channel. The reserve tank is a tank in which the liquid cooling medium is temporarily accumulated. Besides, the act of providing the reserve tank integrally with the water jacket may include a case where the water jacket serves as the reserve tank as well.

Besides, the electrically driven vehicle as each of the embodiments of the invention is also preferred to be equipped with the following configuration in addition to the foregoing configuration. The temperature adjuster is equipped with a duct that is in contact with the reserve tank and sends air to the second battery. Furthermore, if the temperature of the liquid cooling medium in the cooler has exceeded a predetermined threshold temperature, the temperature adjuster sends air to the second battery through the duct. This configuration is advantageous in that the temperature of the liquid cooling medium can be lowered using the temperature adjuster for the second battery if the temperature of the liquid cooling medium is high.

Besides, in the electrically driven vehicle as each of the embodiments of the invention, an air flow channel may be provided between the reserve tank and the second battery. Then, it is appropriate that the temperature adjuster be configured to supply air to the air flow channel while the second battery is in operation. More specifically, the temperature adjuster is equipped with a flow channel switcher that switches over the supply destination of air between the second battery and the aforementioned air flow channel (the air flow channel between the reserve tank and the second battery), and sets the supply destination of air as the aforementioned air flow channel while the second battery is in operation. This configuration makes it possible to reduce the heat transfer between the reserve tank and the second battery. This configuration is suited to thermally protect the second battery from the liquid cooling medium in the reserve tank.

Another embodiment of the electrically driven vehicle disclosed by the present specification is equipped with an inverter, a reserve tank, and a circulation channel as well as the first battery and the second battery. The inverter converts an electric power of each of the first battery and the second battery into an alternating current, and supplies the alternating current to the motor for running. The reserve tank is a container in which a liquid for temperature adjustment is accumulated. "The liquid for temperature adjustment" is a so-called cooling medium. The circulation channel causes the liquid to circulate among the first battery, the inverter and the reserve tank. Then, in each of the embodiments of the invention, the second battery is designed to be an air-cooled type, and the reserve tank is in contact with a case in which the first battery is accommodated, and also in contact with a case in which the second battery is accommodated.

The first battery (the high-output type battery) is higher in output than the second battery (the high-capacity type battery), and therefore generates a large amount of heat. Thus, a liquid-cooled type is adopted for the first battery. On the contrary, since the second battery generates a smaller amount of heat than the first battery, an air-cooled type is adopted for the second battery. It should be noted herein that the reserve tank in which the cooling medium is accumulated is held in contact with the case of the first battery, and the case of the second battery is also held in contact with the reserve tank, whereby the efficiency of adjusting the temperature of the first battery can be enhanced, and the efficiency of adjusting the temperature of the second battery can also be enhanced. This is because both the first battery and the second battery exchange heat with the reserve tank itself.

The second battery is designed to be an air-cooled type, and it is appropriate to adjust the temperature of the air in advance by the reserve tank. Therefore, it is appropriate that the aforementioned electrically driven vehicle be further configured such that the duct through which the air (outside air) sent to the second battery flows is in contact with the reserve tank. Alternatively, it is appropriate that the duct extend through the liquid in the reserve tank. If the temperature of outside air is higher than the temperature of the liquid in the reserve tank when the second battery is cooled, outside air passes through the second battery after being cooled by the liquid in the reserve tank. Still alternatively, in the case where the second battery is preheated in cold regions or the like, if the temperature of the liquid in the reserve tank is higher than the temperature of outside air, outside air is warmed in advance by the liquid in the reserve tank, so that the second battery can be efficiently warmed.

The details of the embodiments of the invention and further improvements thereof will be described hereinafter.

In the following description, "an electrically driven vehicle" includes a hybrid vehicle that is equipped with both a motor and an engine, and a fuel-cell-powered vehicle. First of all, an electric power system of the electrically driven vehicle according to each of the embodiments of the invention will be described. FIG. 1 is a system diagram showing an electric power system of an electrically driven vehicle 2 according to the first embodiment of the invention. The electrically driven vehicle 2 has two batteries (a first battery 4 and a second battery 3) that supply electric power to a motor for running. The first battery 4 is higher in output voltage than the second battery 3, and is smaller in capacity (maximum charging electric power) than the second battery 3. In other words, the second battery 3 is lower in output voltage than the first battery 4, and is larger in capacity (maximum charging electric power) than the first battery 4. The second battery 3 of high-capacity type is connected to a voltage converter 6 via a system main relay 5. An output side of the voltage converter 6 is connected to an inverter 7. Besides, the first battery 4 of high-output type is connected to the inverter 7 via a relay 8. The second battery 3 is lower in output voltage than the first battery 4. Therefore, the voltage converter 6 steps up the output voltage of the second battery 3, so that the output voltage of the second battery 3 coincides with the output voltage of the first battery 4.

Incidentally, more strictly speaking, this means that the high-output type battery (the first battery 4) is higher in output density than the high-capacity type battery (the second battery 3), and that the high-capacity type battery is higher in energy density than the high-output type battery. It should be noted herein that the output density is expressed as an output (W/kg) per unit weight of the battery, and that the energy density is expressed as an electric power (Wh/kg) per unit weight of the battery. However, the present specification simply expresses that the high-capacity type battery is smaller in output and larger in capacity (larger in maximum electric power for charging) than the high-output type battery.

The inverter 7 converts a direct-current electric power of the first battery 4 and/or the second battery 3 into an alternating current, and outputs the alternating current to a motor 9 for running. A controller 10 opens/closes the system main relay 5 and the relay 8 depending on the circumstances, and selects the battery that supplies an electric power to the inverter 7. Specifically, the controller 10 calculates a target output of the motor 9 from sensor data of an accelerator opening degree sensor (not shown), a vehicle speed sensor (not shown) and the like, and closes the system main relay 5 and the relay 8 if the target output is higher than a predetermined threshold output. That is, the controller 10 causes the two batteries to supply an electric power to the inverter 7. Besides, the controller 10 closes the system main relay 5 and opens the relay 8 if the target output is lower than the aforementioned threshold output. That is, only the electric power of the second battery 3 of high-capacity type is supplied to the inverter 7. The first battery 4 of high-output type is used when the vehicle needs to be accelerated. Accordingly, in the case of this embodiment of the invention, the first battery 4 is less frequently used than the second battery 3. The first battery 4 and the second battery 3 are charged through the generation of electricity by the motor 9 using deceleration energy of the vehicle speed. Besides, although a charger and the like are not depicted, the electrically driven vehicle 2 may charge the first battery 4 and the second battery 3 with an electric power supplied from an external power. "The frequency of use" includes, for example, the magnitude of the sum of electric power output from the batteries as well as the magnitude of the frequency of use in the case where the vehicle is caused to run in a steady manner. That is, the second battery may be selected as a battery that is mainly used during the running of the vehicle, and the first battery may be selected as a battery that is supplementarily used during the running of the vehicle.

Figure 2:
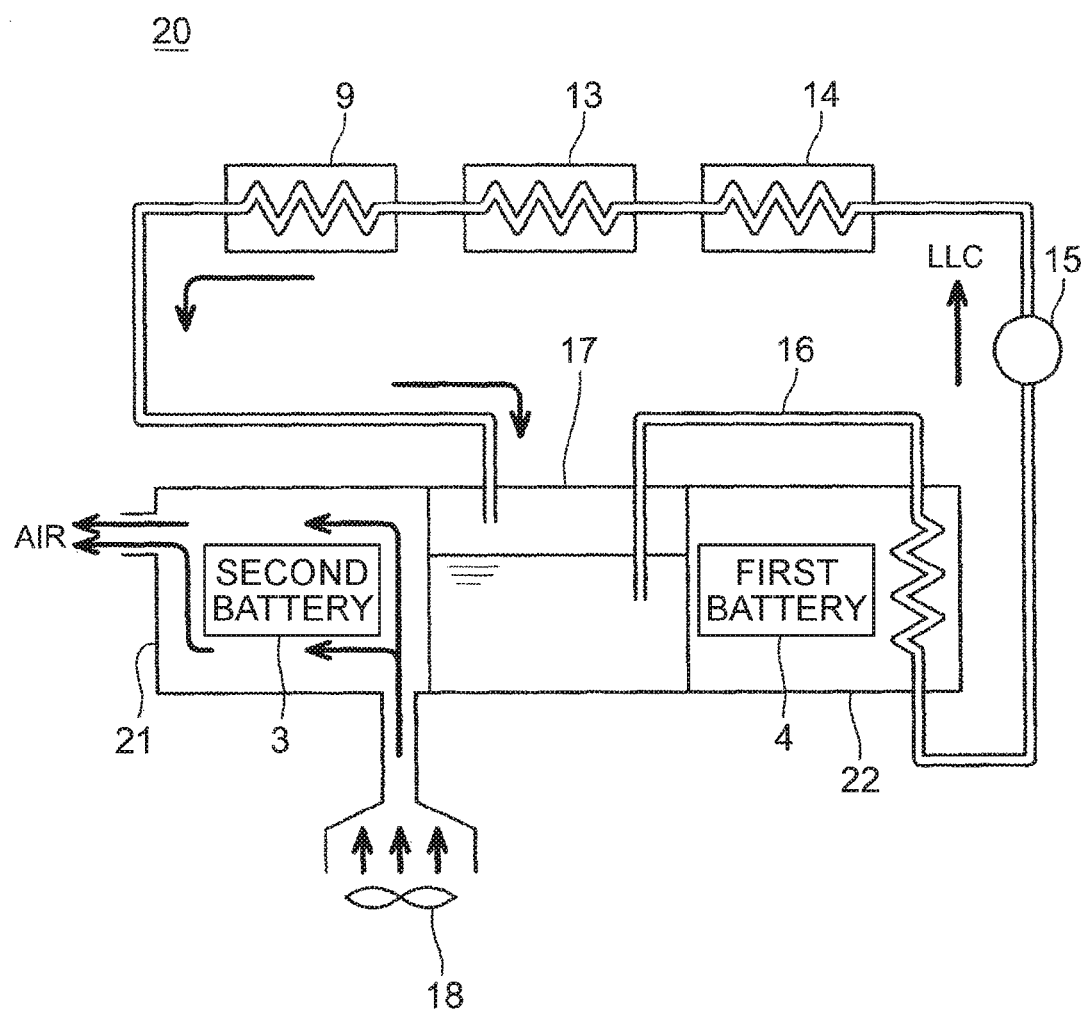
FIG. 2 is a block diagram of a battery temperature adjustment system of the electrically driven vehicle according to the first embodiment of the invention.

FIG. 2 is a block diagram showing a temperature adjustment system 20 that adjusts the temperatures of the first battery 4, the second battery 3, the motor 9, and a power control unit (a PCU) 13. Incidentally, the power control unit 13 is a device in which the inverter 7, the voltage converter 6, the system main relay 5, and the relay 8, which are shown in FIG. 1, are accommodated. Hereinafter, the power control unit 13 will be referred to simply as the PCU 13.

The temperature adjustment system 20 is constituted by a reserve tank 17, a circulation channel 16, an electric pump 15, a radiator 14, and a fan 18. A liquid that cools the motor 9 and the PCU 13 is accumulated in the reserve tank 17. The liquid is typically Long Life Coolant (LLC), but may be water. The LLC is sucked out from the reserve tank 17 by the electric pump 15, flows through the circulation channel 16, exchanges heat, in the order of the first battery 4, the radiator 14, the PCU 13, and the motor 9, with these devices, and returns to the reserve tank 17.

The LLC that has exited the reserve tank 17 flows through an interior of a battery case 22 in which the first battery 4 is accommodated. In the circulation channel 16, the interior of the battery case 22 serves as a heat exchanger, and the LLC exchanges heat with the first battery 4 here. If the temperature of the first battery 4 is higher than the temperature of the LLC, the first battery 4 is cooled by the LLC. If the temperature of the first battery 4 is lower than the temperature of the LLC, the first battery 4 is warmed by the LLC. For example, in the case where the first battery 4 is used in cold regions or the like (especially in the case where the first battery 4 begins to be used from an output stop state), if the temperature of the first battery 4 is lower than a suitable temperature, the first battery 4 is warmed by the LLC, whereby it is possible to prevent a decrease in efficiency due to a low temperature of the first battery 4. As described hitherto, in the temperature adjustment system 20, a liquid-cooled type is adopted for the first battery 4.

The LLC that has passed through the battery case 22 is force-fed by the electric pump 15, and reaches the radiator 14. After being cooled by the radiator, the LLC cools the PCU 13 (i.e., cools the inverter 7) and then cools the motor 9. The LLC absorbs heat from the PCU 13 and the motor 9, and returns to the reserve tank 17. That is, the LLC stored in the reserve tank 17 has a commensurate quantity of heat (a quantity of heat absorbed from the PCU 13 and the motor 9). The LLC of the reserve tank 17 having the quantity of heat is first passed through the first battery 4. Therefore, the first battery 4 can be warmed in cold regions or the like.

Incidentally, during normal running, a temperature adjustment controller (not shown) adjusts the output of the electric pump 15 in accordance with the temperatures of the motor 9 and the PCU 13. Specifically, as the temperature of the motor 9 or the PCU 13 rises, the output of the electric pump 15 is raised, the flow rate of the LLC flowing through the circulation channel 16 per unit time is increased, and the cooling capacity is enhanced.

The second battery 3 of high-capacity type is lower in output voltage than the first battery 4 of high-output type, and hence is not as large in heat generation amount as the first battery 4. Thus, in the electrically driven vehicle 2, an air-cooled type is adopted for the second battery 3 of high-capacity type. Outside air (air) is sent into a battery case 21 of the second battery 3 by the fan 18.

In the temperature adjustment system 20, the second battery 3 is designed as an air-cooled type, but both the battery case 21 in which the second battery 3 is accommodated and the battery case 22 in which the first battery 4 is accommodated are in contact with the reserve tank 17. Accordingly, both the battery cases 21 and 22 exchange heat with the reserve tank 17 (the LLC therein). Besides, as described previously, the LLC that has absorbed heat of the motor 9 and the PCU 13 is accumulated in the reserve tank 17. Therefore, the temperature adjustment system 20 can warm the first battery 4 or the second battery 3 through the heat of the LLC in the reserve tank, and therefore is suited to prevent the batteries from reaching a low temperature especially in cold regions. For example, in the case where the second battery 3 is utilized but the first battery 4 is not utilized (in the case where the electric power of the second battery 3 is supplied to the inverter 7 but the electric power of the first battery 4 is not supplied to the inverter 7) during running, the heat of the motor 9 and the heat of the PCU 13 are stored into the reserve tank 17 by the LLC. At the same time, the second battery 3 is utilized and hence generates heat, but the heat transfers to the LLC in the reserve tank 17 through heat exchange resulting from direct contact between the battery case 21 and the reserve tank 17. As a result, the heat of the motor 9, the PCU 13 and the second battery 3 transfers to the first battery 4 through the battery case 21, and can warm the first battery 4.

By the same token, in the case where the first battery 4 is utilized but the second battery 3 is not utilized during running, the heat of the motor 9, the PCU 13 and the first battery 4 transfers to the second battery 3 through the battery cases 21 and 22 and the reserve tank 17, and can warm the stopped second battery 3. Owing to the foregoing structure, the electrically driven vehicle 2 prevents the stopped battery from reaching a low temperature to such an extent that the efficiency for a subsequent opportunity for utilization decreases especially in cold regions. Besides, due to running on the previous day, the heat of the motor 9 and the PCU 13 may remain in the LLC in the reserve tank 17. For example, when the vehicle is activated on a cold morning, the first battery 4 or the second battery 3 is warmed by the remaining heat of the LLC. Thus, the output of the battery is prevented from decreasing due to a fall in temperature, so that the vehicle can be started with ease.

Figure 3:
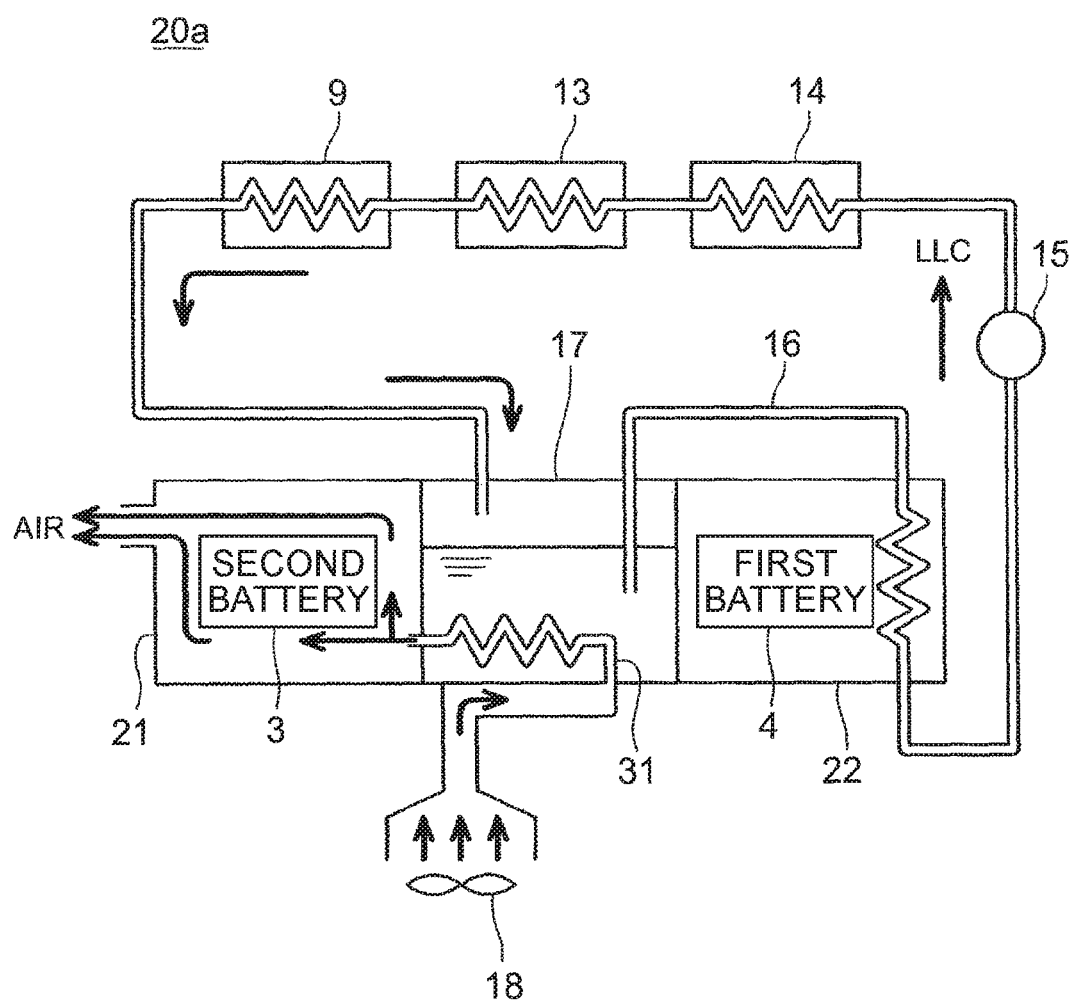
FIG. 3 shows a modification example of a configuration of the temperature adjustment system around a second battery.

In the temperature adjustment system 20 shown in FIG. 2, the temperature of the second battery 3 is adjusted by the outside air delivered by the fan 18. It is also preferable to change the temperature of the outside air delivered through the use of the LLC accumulated in the reserve tank 17, and adjust the temperature of the second battery 3. A temperature adjustment system 20a according to a modification example will be described with reference to FIG. 3. It should be noted in FIG. 3 that components identical to those shown in FIG. 2 are denoted by the same reference symbols respectively.

The temperature adjustment system 20a is different in the structure around the second battery 3 from the aforementioned temperature adjustment system 20. Outside air is delivered to an air duct 31 by the fan 18. Part of the air duct 31 is in contact with an outer face of the reserve tank 17, and the other part extends in the liquid inside the reserve tank 17. The other end of the air duct 31 is open in the battery case 21. Owing to such a structure, outside air exchanges heat with the reserve tank 17 (the LLC inside the reserve tank 17) before exchanging heat with the second battery 3. If the temperature of the LLC is higher than the temperature of outside air, outside air is warmed by the LLC, passes through the periphery of the second battery 3, and effectively warms the second battery 3. If the temperature of the LLC is lower than the temperature of outside air, outside air is cooled by the LLC, passes through the periphery of the second battery 3, and effectively cools the second battery 3. In the temperature adjustment system 20a of FIG. 3, the second battery 3 exchanges heat via contact between the battery case 21 thereof and the reserve tank 17, and exchanges heat also through outside air that has exchanged heat with the LLC in the reserve tank. The electrically driven vehicle that is mounted with the temperature adjustment system shown in FIG. 3 can more efficiently adjust the temperatures of the two kinds of batteries.

Figure 4:
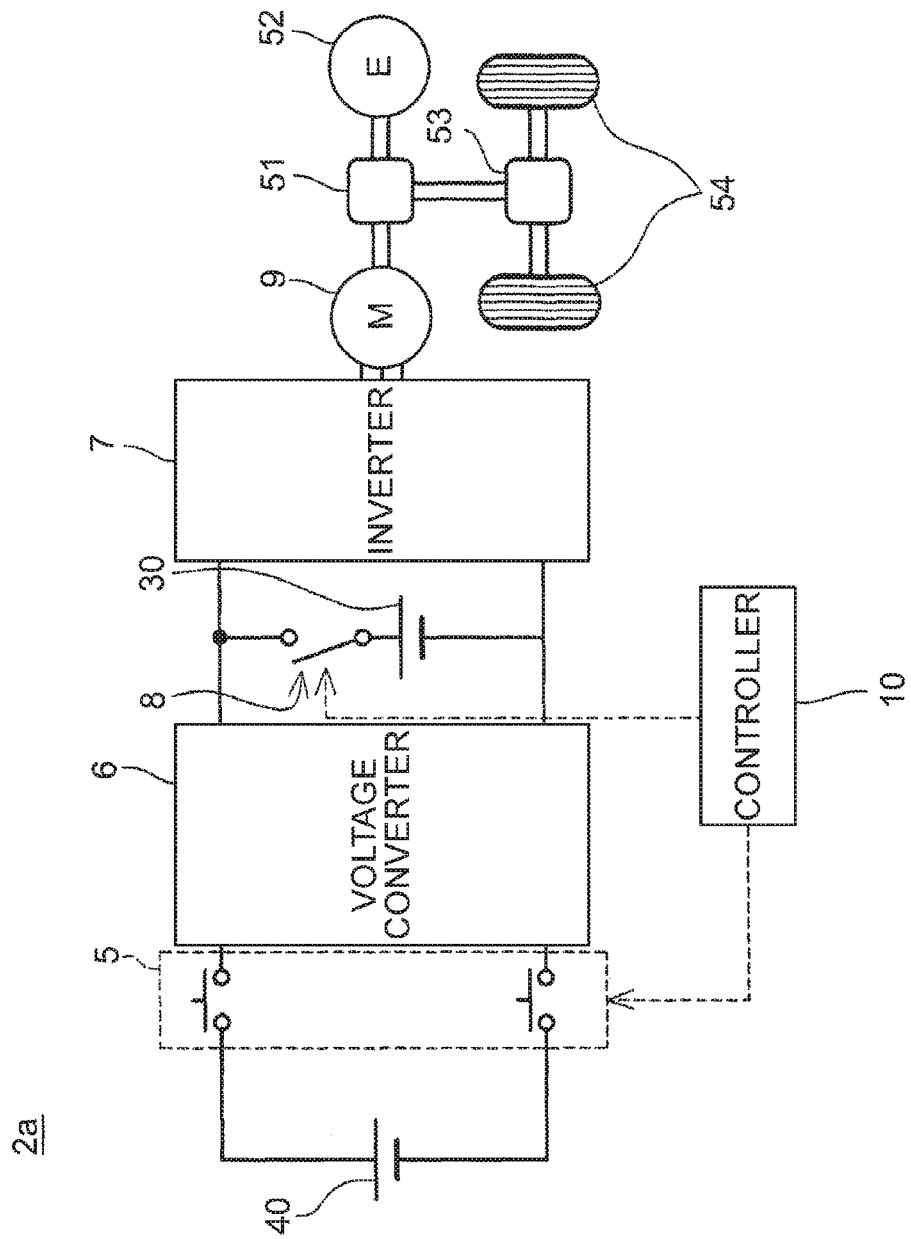
FIG. 4 is a block diagram of the electric power system of the electrically driven vehicle according to each of the second embodiment of the invention.

Next, an electrically driven vehicle according to the second embodiment of the invention will be described. The electrically driven vehicle according to the second embodiment of the invention is a hybrid vehicle that is equipped with a motor and an engine for running. FIG. 4 is a system diagram showing a drive system of a hybrid vehicle 2a. First of all, the configurations of the motor 9 and an engine 52 will be described. Output shafts of the motor 9 and the engine 52 are coupled to a motive power distribution mechanism 51. An output shaft of the motive power distribution mechanism 51 is coupled to wheels 54 via a differential gear 53. Specifically, the motive power distribution mechanism 51 is constituted by a planetary gear. A sun gear of the planetary gear is coupled to the output shaft of the motor 9, a carrier (a pinion gear) of the planetary gear is connected to the output shaft of the engine 52, and a ring gear of the planetary gear is coupled to the wheels 54 via the differential gear 53. The motive power distribution mechanism 51 synthesizes an output torque of the motor 9 and an output torque of the engine 52 with each other, and transmits a resultant torque to the wheels 54. Alternatively, the motive power distribution mechanism 51 distributes the output torque of the engine 52 to the motor 9 and the wheels 54. In the former case, both the output torque of the engine 52 and the output torque of the motor 9 are transmitted to the wheels 54, so that a high torque is obtained. In the latter case, an electric power can be generated by the motor 9 while the vehicle runs. An alternating-current electric power generated by the motor 9 is converted into a direct-current electric power by the inverter 7, and the direct-current electric power is used to charge a battery 40 or a battery 30.

An electric power system of the hybrid vehicle 2a is equipped with the first battery 40 of high-capacity type and the second battery 30 of high-output type. The first battery 40 is connected to the voltage converter 6 via the system main relay 5, and the inverter 7 is connected to the output side of the voltage converter 6. The second battery 30 is connected to an input side of the inverter 7 via the relay 8. In FIG. 4, components identical to those shown in the drawing of FIG. 1 are denoted by the same reference symbols respectively. That is, the system main relay 5, the voltage converter 6, the inverter 7, the relay 8, the motor 9 and the controller 10 are common between the second embodiment of the invention and the first embodiment of the invention. However, the program stored in the controller 10 according to the second embodiment of the invention is different from the program stored in the controller 10 according to the first embodiment of the invention.

In the hybrid vehicle 2a, the engine 52 or the motor 9 is used during normal running. Then, during normal running, the motor 9 is driven by the electric power of the first battery 40 alone. In the case where the motor 9 is required to output a large torque, the electric power of the second battery 30 is used in addition to the electric power of the first battery 40. In a typical case where a large torque is required of the motor 9, a driver depresses an accelerator, and the accelerator opening degree has abruptly become large in a short time. In the case where the accelerator opening degree has abruptly become large, the driver desires acceleration. In such a case, the output torque of the motor 9 is increased. This is equivalent to so-called kick-down. Besides, the electric power of the second battery 30 is used in the case where the motor 9 is used as a starter when the engine 52 is started. In this manner, the first battery 40 is used during normal running, and the second battery 30 is used only in specific situations. To sum it up, the second battery 30 is less frequently used than the first battery 40.

Figure 5A:
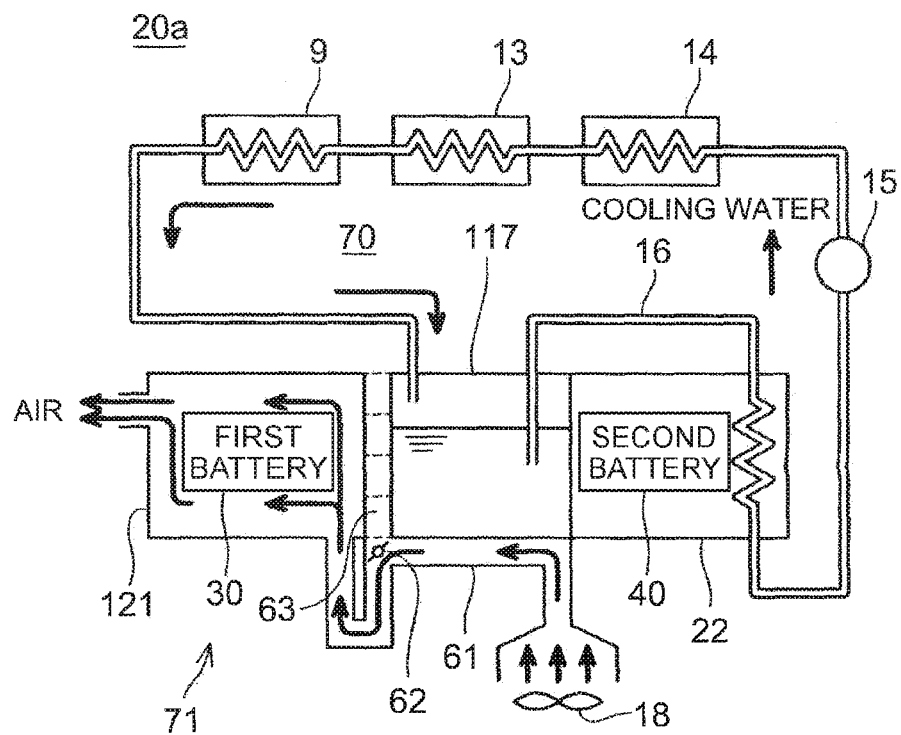
FIGS. 5A and 5B are block diagrams of a battery temperature adjustment system of the electrically driven vehicle according to the second embodiment of the invention, FIG. 5A showing how air is sent to the second battery, and FIG. 5B showing how air is sent to an inter-unit duct.
Figure 5B:
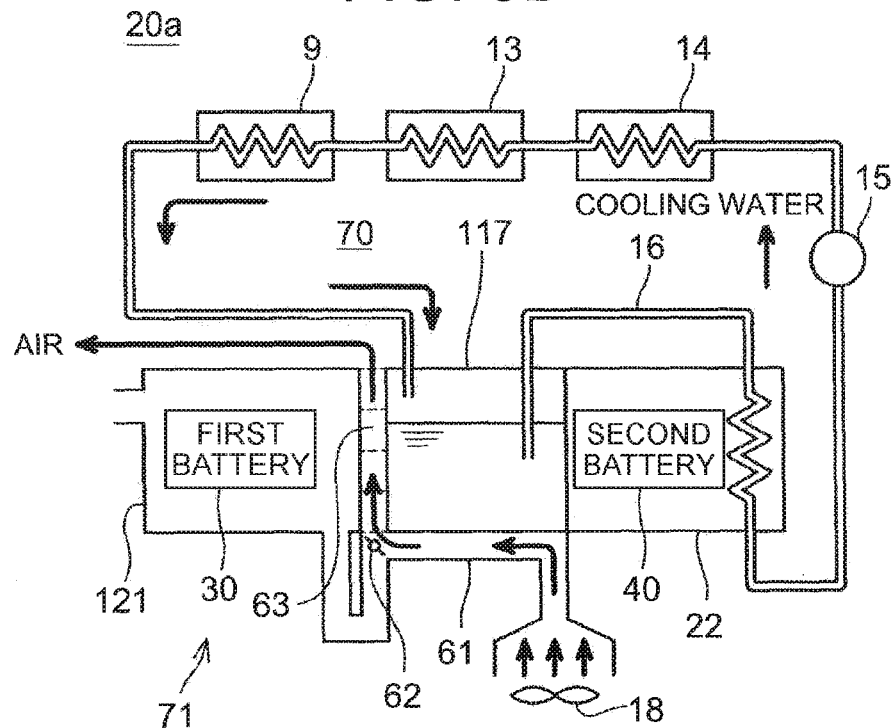

FIG. 5 includes block diagrams showing the temperature adjustment system 20*a* with which the hybrid vehicle 2*a* is equipped. In FIG. 5 as well, components identical to those belonging to the electrically driven vehicle 2 according to the first embodiment of the invention are denoted by the same reference symbols respectively. FIG. 5A shows how the air taken in by a temperature adjuster 71 is sent to a battery case 121 of the second battery 30. FIG. 5B shows how the air taken in by the temperature adjuster 71 is sent to an inter-unit duct 63. The temperature adjuster 71, the inter-unit duct 63 and the like will be described later.

The temperature adjustment system 20*a* is constituted by a liquid-cooled cooler 70 that cools the first battery 40, and the air-cooled temperature adjuster 71 that adjusts the temperature of the second battery 30. The cooler 70 is constituted by a reserve tank 117, the circulation channel 16, the electric pump 15, and the radiator 14. The circulation channel 16 extends through the interior of the battery case 22 of the first battery 40, and cools the first battery 40. Water (cooling water) is used as a cooling medium. That is, the first battery 40 is cooled by cooling water. Besides, the PCU 13 as well as the motor 9 is connected to the circulation channel 16. That is, the cooler 70 cools units such as the PCU 13, the motor 9 and the like (units to be cooled) as well as the first battery 40. The cooler 70 is basically identical in configuration to the cooler belonging to the temperature adjustment system 20 according to the first embodiment of the invention. Incidentally, as is the case with the temperature adjustment system 20 according to the first embodiment of the invention, the reserve tank 117 is in contact with the battery case 22 of the first battery 40. Accordingly, if the temperature of the first battery 40 is higher than the temperature of cooling water, cooling water in the tank deprives the first battery 40 of heat via a housing of the reserve tank 117. The reserve tank 117 that is in contact with the battery case 22 serves as a so-called water jacket. The circulation channel 16 extends via the reserve tank 117, which serves as a water jacket.

The temperature adjuster 71 is constituted by the fan 18, an air introduction duct 61, the inter-unit duct 63, and a flow channel switcher 62. The fan 18 sends outside air to the battery case 121 of the second battery 30 or to the inter-unit duct 63. The air introduced by the fan 18 passes through the air introduction duct 61, and is sent to the flow channel switcher 62. The flow channel switcher 62 switches over the supply destination of the introduced air to either the inter-unit duct 63 or the battery case 121. The inter-unit duct 63 is arranged between the reserve tank 117 and the battery case 121 of the second battery 30. The inter-unit duct 63 has a flat housing. The reserve tank 117 is in contact with one face of the inter-unit duct 63, and the battery case 121 is in contact with the other face of the inter-unit duct 63. In other words, the reserve tank 117 and the battery case 121 are coupled to each other via the inter-unit duct 63.

Figure 6:
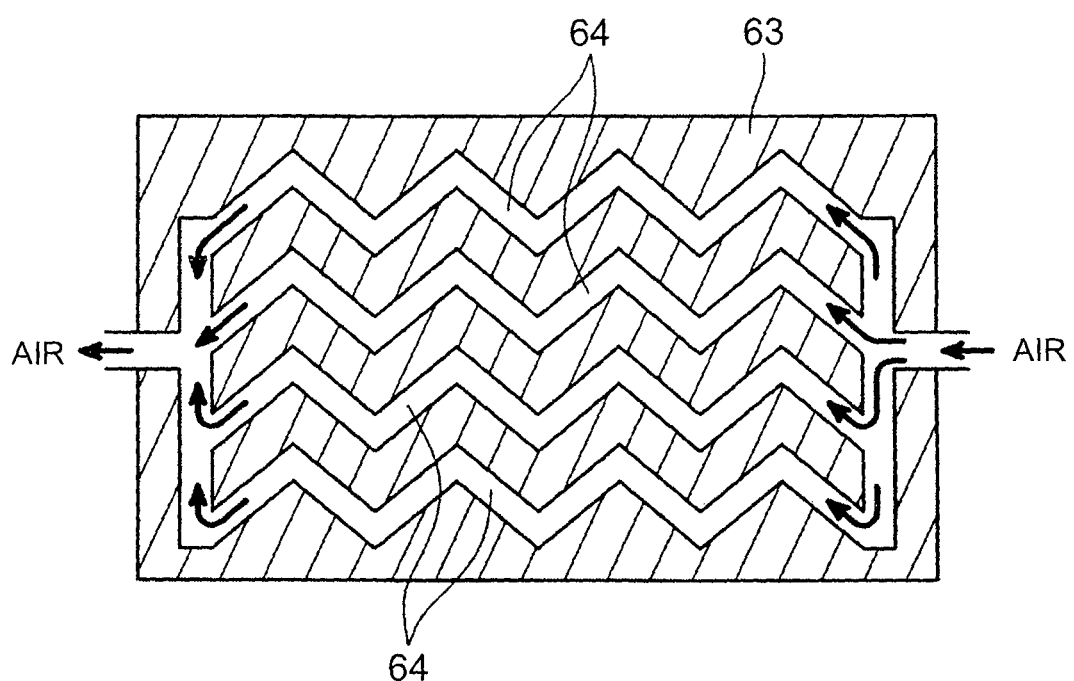
FIG. 6 is a cross-sectional view of the inter-unit duct.

FIG. 6 is a cross-sectional view showing a cross-section of the inter-unit duct 63. The cross-section of FIG. 6 is a drawing of a cross-section that is parallel to opposed faces of the reserve tank 117 and the battery case 121. As shown in FIG. 6, a plurality of air flow channels 64 that are flexed in a zigzag manner are formed inside the inter-unit duct 63. That is, the plurality of the air flow channels 64 are arranged between the reserve tank 117 and the battery case 121. When air is supplied to the inter-unit duct 63, the heat transfer coefficient between the reserve tank 117 and the battery case 121 can be lowered due to the adiabatic effect of the air flowing through the plurality of the air flow channels 64.

FIG. 5A is a view showing a situation in which the flow channel switcher 62 has set the supply destination of the air taken in as the inter-unit duct 63. FIG. 5B is a view showing a situation in which the flow channel switcher 62 has set the supply destination of the air taken in as the battery case 121 of the second battery 30. In the case where the battery case 121 has been set as the supply destination of the air taken in, the air taken in adjusts the temperature of the second battery 30. Besides, at this time, since the air is not supplied to the inter-unit duct 63, the adiabaticity between the reserve tank 117 and the battery case 121 falls, and the thermal conductivity rises. Therefore, the heat of the reserve tank 117 is transferred to the battery case 121, and is transferred to the air from there. That is, the cooling water accumulated in the reserve tank 117 is cooled by the air taken in by the temperature adjuster 71.

In the temperature adjuster 71, the air introduction duct 61 that introduces the air taken in by the fan 18 to the flow channel switcher 62 is also in contact with the reserve tank 117. Therefore, heat is exchanged between the cooling water in, the reserve tank 117 and the air taken in. The air introduction duct 61 serves as a heat exchanger. If the temperature of introduced air is higher than the temperature of, cooling water, introduced air is cooled by cooling water. On the contrary, if the temperature of introduced air is lower than the temperature of cooling water, introduced air is warmed by cooling water. In the latter case, the air warmer than outside air is supplied to the second battery 30. The latter case is effective when the temperature of outside air is low and the temperature of the second battery 30 is below a suitable operating temperature range.

Figure 7:
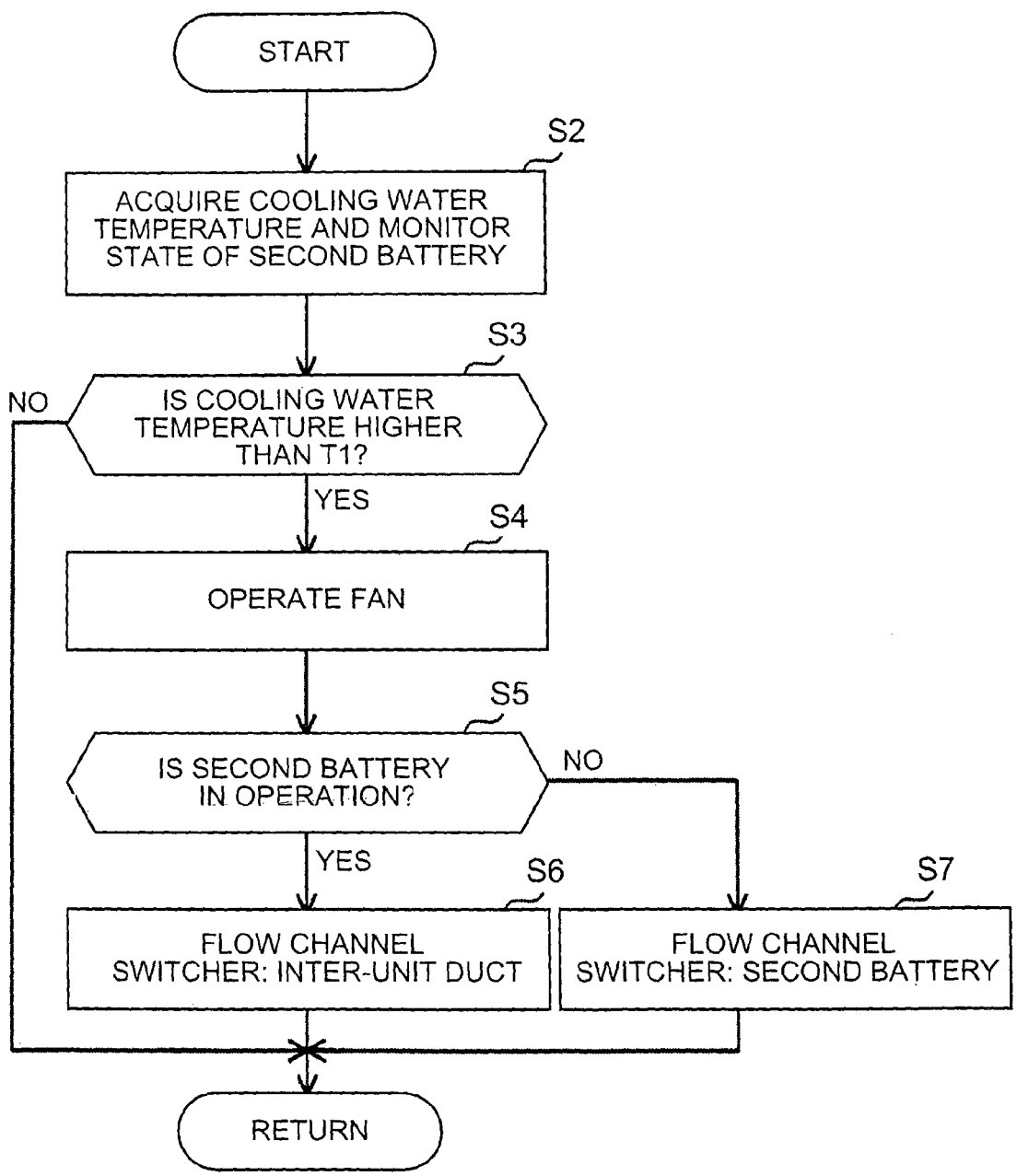
FIG. 7 is a flowchart of a temperature adjustment processing.
Figure 8:
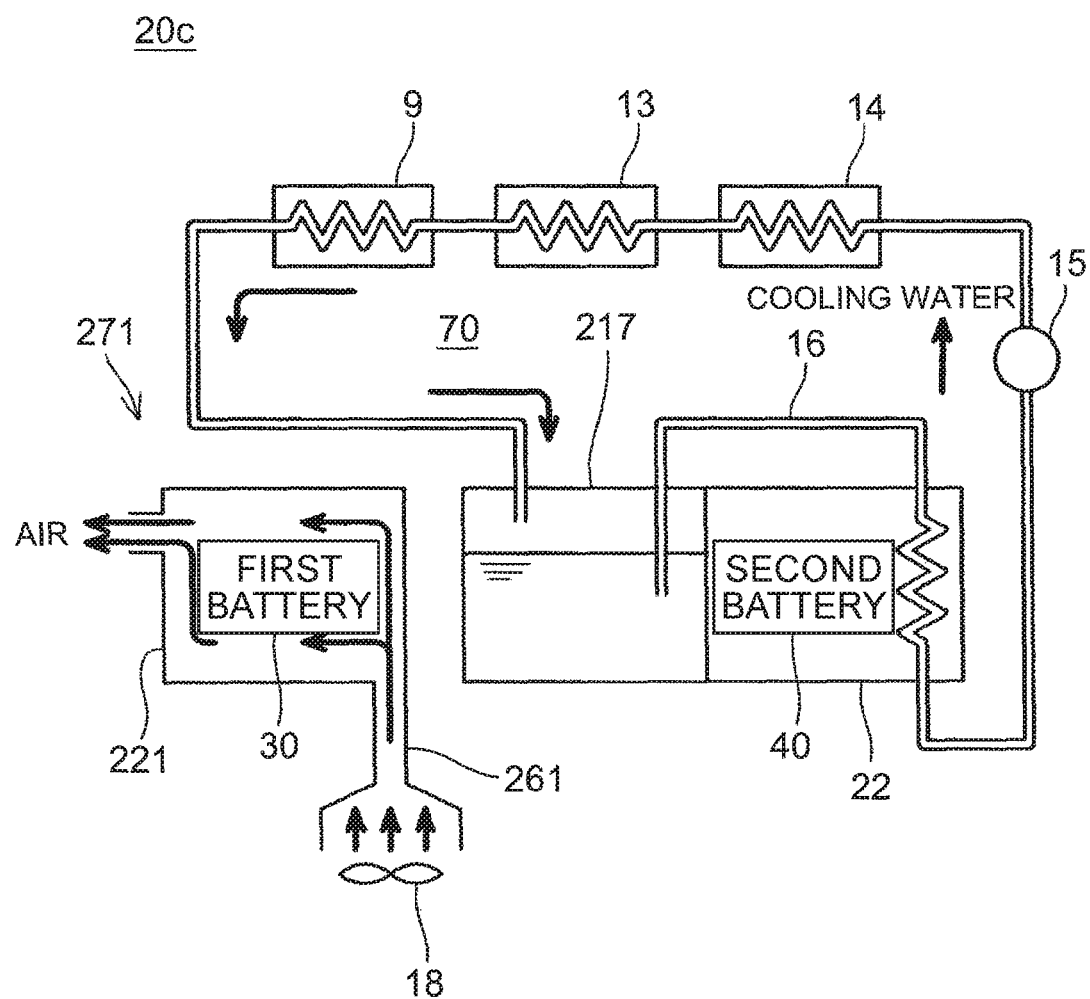
FIG. 8 is a block diagram of a battery temperature adjustment system of the electrically driven vehicle according to the third embodiment of the invention.

FIG. 7 is a flowchart showing a temperature adjustment processing that is performed by a controller (not shown) of the temperature adjustment system 20*a* that includes the cooler 70 and the temperature adjuster 71. The temperature adjustment processing that is performed by the controller will be described with reference to FIG. 7. The processing of FIG. 7 is repeatedly performed on a regular cycle (e.g., on a control cycle of about 10 milliseconds).

First of all, the controller acquires a cooling water temperature, and monitors a state of the second battery 30 (S2). The cooling water temperature is measured by a temperature sensor (not shown) that is attached to the circulation channel 16. Besides, the state of the second battery 30 is a determination as to whether or not the second battery 30 is in operation (i.e., whether or not the electric power of the second battery 30 is in use).

Subsequently, the controller determines whether or not the cooling water temperature has exceeded a threshold temperature T1 that is determined in advance (S3). This threshold temperature T1 is determined in advance in such a manner as to be associated with an outside air temperature at a current time. If the cooling water temperature has exceeded the threshold temperature T1, namely, if the cooling water temperature is higher than the outside air temperature (the threshold temperature T1) (S3: YES), the controller operates the fan 18 of the temperature adjuster 71 (S4). Then, the fan 18 takes outside air in. The air taken in passes through the air introduction duct 61. In the air introduction duct 61 that is in contact with the reserve tank 117, the introduced air deprives the cooling water in the reserve tank 117 of heat, and thus lowers the temperature of cooling water. In this manner, if the temperature of cooling water is high (S3: YES), the temperature adjuster 71 that is intrinsically designed to adjust the temperature of the second battery 30 is used to supplement the cooler 70.

If the result of the determination in step S3 is NO, the controller suspends the processing of FIG. 7 without doing anything. Incidentally, in this case, the controller specifies a flow rate of the cooling water to be caused to flow to the circulation channel 16, on the basis of the cooling water temperature and a temperature of the first battery 40, and controls the electric pump 15 in such a manner as to realize the flow rate.

Subsequently to the process of step S4, the controller determines whether or not the second battery 30 is in operation (S5). This determination is made on the basis of the state of the second battery 30 monitored in the aforementioned step S2. If the second battery 30 is in operation, the controller controls the flow channel switcher 62, and guides the air introduced by the fan 18 to the inter-unit duct 63 (S5: YES, S6). As described previously, if the result of the determination in step S3 is YES, the temperature of cooling water is higher than the outside air temperature. Therefore, if the heat of the cooling water accumulated in the reserve tank 117 reaches the second battery 30, the temperature of the second battery 30 rises. Thus, during the operation of the second battery 30, air is supplied to the inter-unit duct 63, so that the heat transfer coefficient between the reserve tank 117 and the battery case 121 is lowered. Besides, at this time, the heat of the cooling water in the reserve tank 117 is absorbed by the air passing through the inter-unit duct 63. Therefore, the temperature of the cooling water in the reserve tank 117 falls.

On the other hand, if the second battery 30 is not in operation, the controller controls the flow channel switcher 62, and guides the air introduced by the fan 18 into the second battery 30 (the battery case 121) (S5: NO, S7). The heat of the cooling water in the reserve tank 117 is transferred to the battery case 121 of the second battery 30, but is conveyed to the outside by the air flowing through the interior of the battery case 121. The air flowing through the interior of the battery case 121 conveys the heat of the second battery 30 itself to the outside, and also conveys the heat received from the reserve tank 117 to the outside. Incidentally, at this time, the second battery 30 that is out of operation serves as a heat absorbing material that absorbs the heat transferred from the reserve tank 117.

Except for the foregoing, the temperature adjustment system 20a is identical to the temperature adjustment system 20 according to the first embodiment of the invention. That is, the temperature adjustment system 20a controls the electric pump 15 in accordance with the circumstances, and adjusts the flow rate of circulating cooling water. Besides, the temperature adjustment system 20a controls the fan 18 in accordance with the circumstances, and adjusts the flow rate of the air supplied to the battery case 121 or the inter-unit duct 63.

Third Embodiment

Next, an electrically driven vehicle according to the third embodiment of the invention will be described. The electrically driven vehicle according to the third embodiment of the invention is identical in drive system to the hybrid vehicle 2a according to the second embodiment of the invention. That is, the electrically driven vehicle according to the third embodiment of the invention is equipped with the high-capacity type first battery 40 and the high-output type second battery 30. Besides, the electrically driven vehicle according to the third embodiment of the invention is equipped with a reserve tank 217. Outside air (air) is delivered to a battery case 221 of the second battery 30 by the fan 18. During normal running, the motor 9 is driven by the electric power of the first battery 40 alone. In the case where a high torque is required of the motor 9, the electric power of the second battery 30 is utilized. The second battery 30 is less frequently used than the first battery 40.

There is shown a block diagram of a temperature adjustment system 20c with which the electrically driven vehicle according to the third embodiment of the invention is equipped. This temperature adjustment system 20c is equipped with the cooler 70 that cools the first battery 40, the motor 9, and the PCU 13 by a cooling liquid as a liquid cooling medium, and a temperature adjuster 271 that adjusts the temperature of the second battery 30 in an air-cooled manner. The temperature adjuster 271 is equipped with the fan 18 and an air introduction duct 261. The electrically driven vehicle according to the third embodiment of the invention is different from the electrically driven vehicle (the hybrid vehicle 2a) according to the second embodiment of the invention in that the cooler 70 and the temperature adjuster 271 are independent of each other. Specifically, as opposed to the second embodiment of the invention, no inter-unit duct is arranged between the reserve tank 217 and the battery case 221 of the second battery 30. Besides, as opposed to the second embodiment of the invention, in the temperature adjuster 271, the air introduction duct 261 that guides the air taken in by the fan 18 into the battery case 221 is not in contact with the reserve tank 217. The electrically driven vehicle according to the third embodiment of the invention cools the first battery 40 with high frequency of use by the liquid cooling medium, and cools (adjusts the temperature of) the second battery 30, which is not used as frequently as the first battery 40, by air. The electrically driven vehicle according to the third embodiment of the invention cools the batteries in accordance with their frequencies of use, and therefore is efficient.

The points to remember about the art described in each of the embodiments of the invention will be described. In the electrically driven vehicle according to the first embodiment of the invention, the reserve tank 17 is in contact with the battery case 22 in which the first battery 4 is accommodated, and the battery case 21 in which the second battery 3 is accommodated, and adjusts the temperatures of those cases. In the case where the flowing liquid is a liquid such as LLC or the like, the reserve tank 17, through the interior of which the liquid passes, exchanges heat with a target through contact, and hence can also be regarded as having the function of a water jacket.

The first battery may be designed as either a high-output type or a high-capacity type. The second battery, which is less frequently used than the first battery, may also be designed as either a high-output type or a high-capacity type. The invention is an art suited for an electrically driven vehicle that has different types of batteries, namely, a high-capacity type battery and a high-output type battery.

The inter-unit duct 63 is equivalent to an example of the air flow channel that is provided between the reserve tank 117 and the second battery 30.

The temperature of the second battery 3 (30) is basically adjusted by a gas (air). However, the case 21 (121) of the second battery 3 (30) abuts on the reserve tank 17 (117), and the temperature of the second battery 3 (30) is susceptible to the influence of the LLC (cooling water) stored in the reserve tank 17 (117). In other words, it should be noted that the temperature of the second battery 3 (30) is basically adjusted by the gas, but is susceptible to the influence of the temperature of the liquid cooling medium. Furthermore, in other words, the temperature of the second battery 3 (30) is basically adjusted by the gas, but the temperature is supplementarily adjusted by the liquid cooling medium.

The electrically driven vehicle according to each of the embodiments of the invention is a vehicle that is equipped with a motor for running. The art disclosed by the present specification is also suited to be applied to a hybrid vehicle that is equipped with both a motor and an engine for running. Besides, the art disclosed by the present specification is also suited to be applied to a vehicle in which at least one of the first battery and the second battery is a fuel cell.

In the first embodiment of the invention, the first battery 4 of high-output type and the second battery 3 of high-capacity type are typically a lithium-ion battery and a nickel cadmium battery, but may be other kinds of batteries such as fuel cells and the like. The first battery 4 of high-output type may be a capacitor.

In the present specification, the expression that the battery "is stopped" has been used several times. It should be noted in the present specification that the state of the battery "being stopped" includes not only a state in which the electric power of the battery is not in use but also, for example, a state in which the relay 8 is open.

The concrete examples of the invention have been described above in detail. However, these concrete examples are nothing more than exemplifications, and do not limit the invention. The invention encompasses various modifications and alterations of the concrete examples exemplified above. The technical elements described in the detailed description or the drawings may offer technical availability alone or in various combinations. Besides, the art exemplified in the detailed description or the drawings can achieve a plurality of objects at the same time, and has technical availability by achieving one of the objects in itself.

The invention claimed is:

1. An electrically driven vehicle comprising:
a motor for running;
a first battery that is configured to supply an electric power to the motor, the first battery having a first capacity and a first output;
a second battery that is configured to supply an electric power to the motor, the second battery having a second capacity and a second output;
a liquid-cooled cooler that is configured to cool the first battery;
a temperature adjuster that is configured to adjust a temperature of the second battery using a gas as a heat medium,
wherein the second capacity is different from the first capacity, and the second output is different from the first output;
the liquid cooled cooler comprising a circulation channel configured to circulate a liquid cooling medium to the first battery and another unit that is different from the first battery; and
a heat exchanger configured to exchange heat between the liquid cooling medium and air that is taken in by the temperature adjuster.

2. The electrically driven vehicle according to claim 1, wherein
the second output is higher than the first output, and the second capacity is smaller than the first capacity.

3. The electrically driven vehicle according to claim 1, wherein
the second output is lower than the first output, and the second capacity is larger than the first capacity.

4. The electrically driven vehicle according to claim 1, wherein
the second battery is configured to be less frequently used than the first battery.

5. The electrically driven vehicle according to claim 1, wherein
the first battery is equipped with a water jacket, and the circulation channel extends via the water jacket.

6. The electrically driven vehicle according to claim 5, further comprising:
a reserve tank in which the liquid cooling medium is accumulated, wherein
the circulation channel extends via the reserve tank, and the water jacket and the reserve tank are integrated with each other.

7. The electrically driven vehicle according to claim 6, wherein
the temperature adjuster is equipped with a first duct, the first duct is in contact with the reserve tank and the first duct is configured to send air to the second battery, and
the temperature adjuster is configured to send air to the second battery through the first duct when a temperature of the liquid cooling medium has exceeded a predetermined threshold temperature.

8. The electrically driven vehicle according to claim 7, wherein
an air flow channel is provided between the reserve tank and the second battery,
the temperature adjuster is configured to supply air to the air flow channel when the second battery is in operation, and
the temperature adjuster is configured to supply air to the second battery when the second battery is stopped.

9. The electrically driven vehicle according to claim 1, further comprising:
an inverter that is configured to convert an electric power of the first battery and the second battery into an alternating current and supply the alternating current to the motor;
a reserve tank in which a liquid for temperature adjustment is accumulated; and
a circulation channel that is configured to circulate the liquid among the first battery, the inverter, and the reserve tank, wherein
the reserve tank is in contact with a first case in which the first battery is accommodated, and
the reserve tank is in contact with a second case in which the second battery is accommodated.

10. The electrically driven vehicle according to claim 9, wherein
a second duct through which air sent to the second battery flows is in contact with the reserve tank.

11. The electrically driven vehicle according to claim 9, wherein
a second duct through which air sent to the second battery flows extends through an interior of the reserve tank.

12. The electrically driven vehicle according to claim 4, wherein
the second battery is configured to, when the vehicle is caused to run in a steady manner, be less frequently used than the first battery.

13. The electrically driven vehicle according to claim 4, wherein
when the vehicle is caused to run in a steady manner, a sum of electric power that is output from the second battery is smaller than a sum of electric power that is output from the first battery.

14. The electrically driven vehicle according to claim 8, wherein
the temperature adjuster is equipped with a flow channel switcher that is configured to switch over a supply destination of air introduced into the first duct, to the air flow channel or the second battery.

\* \* \* \* \*